(12) United States Patent
Amm et al.

(10) Patent No.: US 6,781,739 B1
(45) Date of Patent: Aug. 24, 2004

(54) HIGH-FREQUENCY AC DRIVE FOR MEM DEVICES

(75) Inventors: David T. Amm, Sunnyvale, CA (US); Douglas A. Webb, Los Altos, CA (US)

(73) Assignee: Silicon Light Machines, Inc., Sunnyvale, CA (US)

( * ) Notice: Subject to any disclaimer, the term of this patent is extended or adjusted under 35 U.S.C. 154(b) by 9 days.

(21) Appl. No.: 10/366,869

(22) Filed: Feb. 14, 2003

(51) Int. Cl.$^7$ ................................................ G02F 1/01
(52) U.S. Cl. ...................... 359/276; 359/290; 359/238; 359/298; 359/231
(58) Field of Search ................................ 359/290, 214, 359/231, 237, 238, 276, 278, 298, 572, 573

(56) References Cited

U.S. PATENT DOCUMENTS

| 3,813,142 A | * | 5/1974 | Buhrer ........................ 385/10 |
| 5,444,566 A | * | 8/1995 | Gale et al. .................. 359/291 |
| 6,215,579 B1 | | 4/2001 | Bloom et al. |

OTHER PUBLICATIONS

D.M. Bloom, et al. "The Grating Light Valve: revolutionizing display technology" Feb. 1997, 10 sheets, vol. 3013; Projection Displays III Symposium, San Jose, CA.

D.T. Amm, et al. "Grating Light Valve Technology: Update and Novel Applications", May 19, 1998, pp. 1–4, Silicon Light Machines. Presented at Society for Information Display Symposium, Anaheim, CA.

David T. Amm, et al. "Optical Performance of the Grating Light Valve Technology", 1999, pp. 1–8, Silicon Light Machines. Presented at Photonics West–Electronics Imaging.

R.W. Corrigan, et al. "An Alternative Architecture for High Performance Display", Nov. 20, 1999, pp. 1–5, Silicon Light Machines. Presented at SMPTE Technical Conference and Exhibition, New York, NY.

R.W. Corrigan, et al. "Calibration of a Scanned Linear Grating Light Valve Projection System", May 18, 1999, pp. 1–4, Silicon Light Machines. Presented at Society for Information Display Symposium, San Jose, CA.

Robert Corrigan, et al. "Silicon Light Machines—Grating Light Valve Technology Brief", Jun. 2001, pp. 1–8; Sunnyvale, California.

\* cited by examiner

Primary Examiner—Hung Xuan Dang
Assistant Examiner—Tuyen Tra
(74) Attorney, Agent, or Firm—Okamoto & Benedicto LLP

(57) ABSTRACT

One embodiment disclosed relates to a method for driving a micro electromechanical (MEM) device. The method includes generating a high-frequency AC drive signal that is substantially greater in frequency than a resonance frequency of a movable feature in the MEM device, and modulating the amplitude of the high-frequency AC drive signal. A DC-like displacement of the movable feature in the MEM device is achieved by driving the movable feature using the amplitude modulated high-frequency AC drive signal.

21 Claims, 16 Drawing Sheets

| Element ID 802 | Desired Intensity 804 | Drive Voltage Level 806 |
|---|---|---|
| 1 | 0 | 0 |
| 1 | 1 | 2.8 |
| 1 | 2 | 4.1 |

| 1024 | 253 | 12.7 |
|---|---|---|
| 1024 | 254 | 13.5 |
| 1024 | 255 | 13.8 |

800

| Element ID 802 | Desired Intensity 804 | Drive Voltage Level 806 |
|---|---|---|
| 1 | 0 | 0 |
| 1 | 1 | -2.9 |
| 1 | 2 | -4.0 |

| | | |
|---|---|---|
| 1024 | 253 | -12.4 |
| 1024 | 254 | -12.8 |
| 1024 | 255 | -13.1 |

850

$Q=1000$
$\omega_o=1E6$ rad/sec rectification mechanical filtering

- At high frequency, the ribbon deflection is characterized by:
  - an average DC offset
  - an AC deflection ripple

| Element ID 1502 | Desired Displacement or Other Characteristic 1504 | AC Drive Signal Amplitude 1506 |

HIGH-FREQUENCY AC DRIVE FOR MEM DEVICES

RELATED APPLICATIONS

The present application is related to commonly-assigned U.S. patent application Ser. No. 10/225,376, entitled "Adaptive Bipolar Operation of MEM Device," filed Aug. 19, 2002 by inventors Omar Leung, Aki Tomita and David T. Amm. The present application is also related to commonly-assigned U.S. patent application Ser. No. 10/183,579, entitled "Bipolar Operation of Light-Modulating Array," filed Jun. 26, 2002 by inventors David A. LeHoty and Bryan Staker.

BACKGROUND OF THE INVENTION

1. Field of the Invention

The present invention relates generally to optical systems. The present invention relates more particularly to micro electromechanical (MEM) devices that may be used in optical systems.

2. Description of the Background Art

Arrays of light-modulating elements have been applied to communications and display systems. The light-modulating elements may comprise, for example, the GLV™ light modulator available from Silicon Light Machines in Sunnyvale, Calif. For example, the arrays may be used as a micro electromechanical system (MEMS) for use in optical networks. In another application, a two-dimensional projection image may also be formed by using one or more linear arrays of light-modulating elements. In such display systems, the linear array modulates an incident light beam to display pixels along a column (or, alternatively, a row) of the two-dimensional (2D) image. A scanning system is used to move the column across the screen such that each light-modulating element is able to generate a row of the 2D image. In this way, the entire 2D image is displayed.

Publications describing GLV™ light modulator devices and their applications include, among others: "The Grating Light Valve: Revolutionizing Display Technology," by D. M. Bloom, Projection Displays III Symposium, SPIE Proceedings, Volume 3013, San Jose, Calif., February 1997; "Grating Light Valve Technology: Update and Novel Applications," by D. T. Amm and R. W. Corrigan of Silicon Light Machines in Sunnyvale, Calif., a paper presented at the Society for Information Display Symposium, May 19, 1998, Anaheim, Calif.; "Optical Performance of the Grating Light Valve Technology," David T. Amm and Robert W. Corrigan of Silicon Light Machines, a paper presented at Photonics West-Electronics Imaging, 1999; "Calibration of a Scanned Linear Grating Light Valve Projection System," R. W. Corrigan, D. T. Amm, P. A. Alioshin, B. Staker, D. A. LeHoty, K. P. Gross, and B. R. Lang, a paper presented at the Society for Information Display Symposium, May 18, 1999, San Jose, Calif.; "An Alternative Architecture for High Performance Display," R. W. Corrigan, B. R. Lang, D. A. LeHoty, and P. A. Alioshin of Silicon Light Machines, a paper presented at the 141st SMPTE Technical Conference and Exhibition, Nov. 20, 1999, New York, N.Y.; "Breakthrough MEMS Component Technology for Optical Networks," Robert Corrigan, Randy Cook, and Olivier Favotte, Silicon Light Machines—Grating Light Valve Technology Brief, 2001; and U.S. Pat. No. 6,215,579, entitled "Method and Apparatus for Modulating an Incident Light Beam for Forming a Two-Dimensional Image," and assigned at issuance to Silicon Light Machines. Each of the above-mentioned publications is hereby incorporated by reference in its entirety.

One disadvantageous aspect of using such light modulators and other MEMS technology relates to changes in device performance as a function of time. Whether used in a communication or other system, the response function of a light modulator element and other MEM devices has been observed to change over time. Such time-dependent changes can lead to unpredictable behavior and thus may limit the applications for light modulator elements and other MEM devices.

SUMMARY

One embodiment of the invention pertains to a method for driving a micro electromechanical (MEM) device. The method includes generating a high-frequency AC drive signal that is substantially higher in frequency than a resonance frequency of a movable feature in the MEM device, and modulating the amplitude of the high-frequency AC drive signal. A DC-like displacement of the movable feature in the MEM device is achieved by driving the movable feature using the amplitude modulated high-frequency AC drive signal.

Another embodiment of the invention relates to an apparatus for driving a movable feature in a micro electromechanical (MEM) device to a nearly static displacement level. The apparatus includes a high-frequency signal generator, an amplitude modulator, and a controller. The signal generator generates an AC drive signal that is substantially higher in frequency than a resonance frequency of the movable feature. The amplitude modulator modulates the high-frequency AC drive signal to the appropriate amplitude prior to application of the drive signal to the movable feature in the MEM device. The appropriate amplitude corresponds to a nearly static displacement level and is determined by the controller.

Another embodiment of the invention pertains to a method for driving a micro electromechanical (MEM) device using a square-wave bipolar drive signal. The drive signal is generated such that the transition time between the polarities of the square wave is shorter than the response time of the movable feature of the MEM device. This results in a nearly static displacement of the movable feature.

These and other features of the present invention will be readily apparent to persons of ordinary skill in the art upon reading the entirety of this disclosure, which includes the accompanying drawings and claims.

BRIEF DESCRIPTION OF THE DRAWINGS

FIGS. 1 through 5 relate to light modulators, such as GLV™ light modulator devices.

FIG. 1 is a diagram depicting the reflective and diffractive operational states of a light modulator element.

FIG. 2 is an illustration depicting a light modulator element comprising pairs of fixed and movable ribbons.

FIG. 3 is a diagram depicting deflections of reflective members for a light modulator element in diffractive state.

FIG. 4 is a graph illustrating a unipolar electro-optic response for a first order diffraction from a light modulator element.

FIG. 6 is a flow chart depicting a method for bipolar DC driving of a light-modulating array.

FIG. 7 is a diagram depicting an apparatus for bipolar DC driving of a light-modulating array.

FIG. 8A is a diagram depicting a first look-up table for a first polarity of the bipolar DC driving.

FIG. 8B is a diagram depicting a second look-up table for a second polarity of the bipolar DC driving.

FIGS. 9 through 15 relate to a high-frequency AC drive for a MEM device in accordance with an embodiment of the Invention.

FIG. 9 is a graph depicting an example mechanical resonance.

FIG. 10 is a graph depicting a high-frequency AC drive signal as a function of time in accordance with an embodiment of the present invention.

FIG. 11 is a graph depicting the applied force as a function of time due to the high-frequency AC drive signal in accordance with an embodiment of the present invention.

FIG. 12 is a graph depicting the resulting displacement as a function of time of a light modulator ribbon or similar MEM feature being driven in accordance with an embodiment of the present invention.

FIG. 13 is a flow chart depicting a method for driving a MEM device in accordance with an embodiment of the invention.

FIG. 14 is a schematic diagram of an apparatus for driving a MEM device in accordance with an embodiment of the invention.

FIG. 15 is a diagram depicting a look-up table for high-frequency AC driving of a MEM device in accordance with an embodiment of the invention.

The use of the same reference label in different drawings indicates the same or like components. Drawings are not to scale unless otherwise noted.

DETAILED DESCRIPTION

One cause of the time-dependent performance of light modulator technology relates to charge build-up in the light-modulating elements. As an element operates, electrical charge can build up on the dielectric surfaces of the devices. This charge build-up disadvantageously results in changes in performance over time.

Embodiments of the present invention provide a new and inventive driving technique for overcoming such disadvantageous charge build-up. The invention is particularly applicable to light modulator elements, such as GLV™ light modulator devices, but it may also be applicable to other MEM devices. The invention should reduce the time-dependency in the behavior of such devices and may be used in communications systems, display systems, and other types of systems.

Light Modulator Devices

This section describes light modulator elements, such as GLV™ light modulator devices. These elements are a type of MEM device. The present invention may be utilized in driving such light modulator elements. The present invention may also be utilized in driving other MEM devices that are insensitive to polarity in regards to the driving signal, such as other capacitively-coupled MEM devices.

Figure 1:
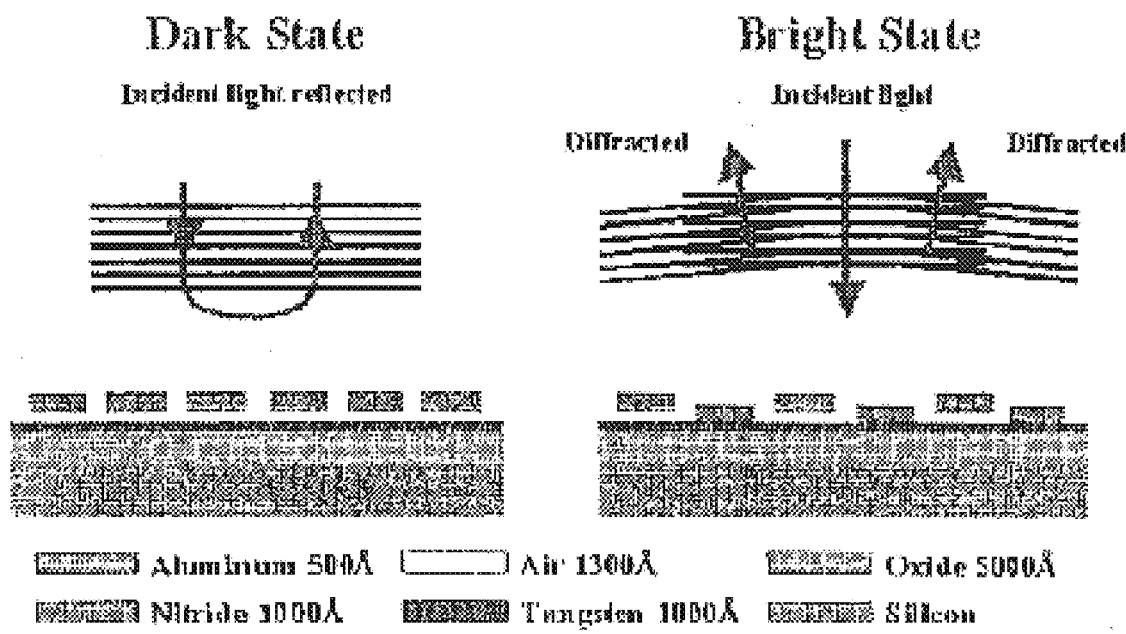

FIG. 1 is a diagram depicting the reflective and diffractive operational states of a light modulator element. The left side of the diagram depicts the reflective (dark) state, while the right side of the diagram depicts the diffractive (bright) state.

In the example illustrated in FIG. 1, the substrate may comprise a silicon substrate with oxide (for example, about 5000 angstroms thick) overlaying the silicon, and tungsten (for example, about 1000 angstroms thick) overlaying the oxide. The reflective members lie above the tungsten with an air space therebetween. For example, three pairs of reflective members (i.e. six members) are shown. The reflective members may, for example, comprise reflective ribbons comprising nitride (for example, about 1000 angstroms thick) with a reflective layer of aluminum (for example, about 500 angstroms thick) on the nitride. Incident light is beamed onto the reflective members. The incident light beam may be at a perpendicular angle to the plane of the substrate.

In the reflective or dark state (left side), all the reflective members are in the same plane, and the incident light is reflected from the surfaces of the members. This reflective state may be called the dark state because it may be used to produce a dark spot (dark pixel) in a projection display system. Such a dark pixel may be produced by blocking the light that is reflected back along the same path as the incident light.

In the diffractive or bright state (right side), alternate ones of the reflective members are deflected downward. This results in the diffraction of the incident light in a direction that is at an angle to the path of the incident light. This reflective state may be called the bright state because it may be used to produce a bright spot (bright pixel) in a projection display system. Such a bright pixel may be produced because the angularly reflected light is not blocked. As discussed further below, the optical response of the element depends on the amount of downward deflection of the alternate members.

Figure 2:
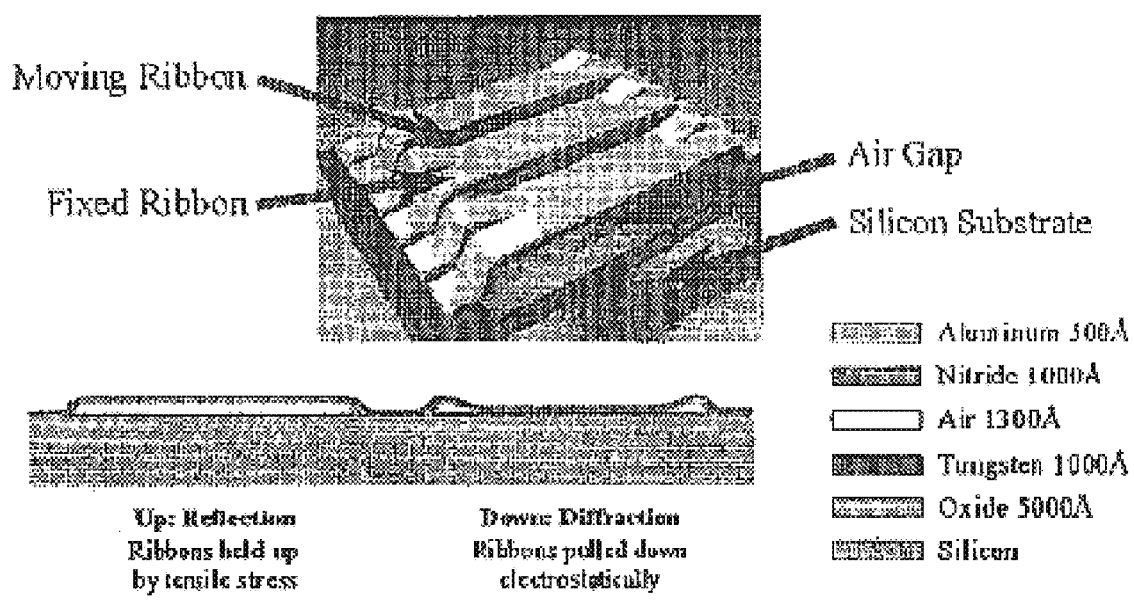

FIG. 2 is an illustration depicting a light modulator element comprising pairs of fixed and movable ribbons. As depicted in FIG. 2, the light modulator element may include pairs of reflective ribbons, each pair having one fixed and one movable ribbon.

Figure 3:
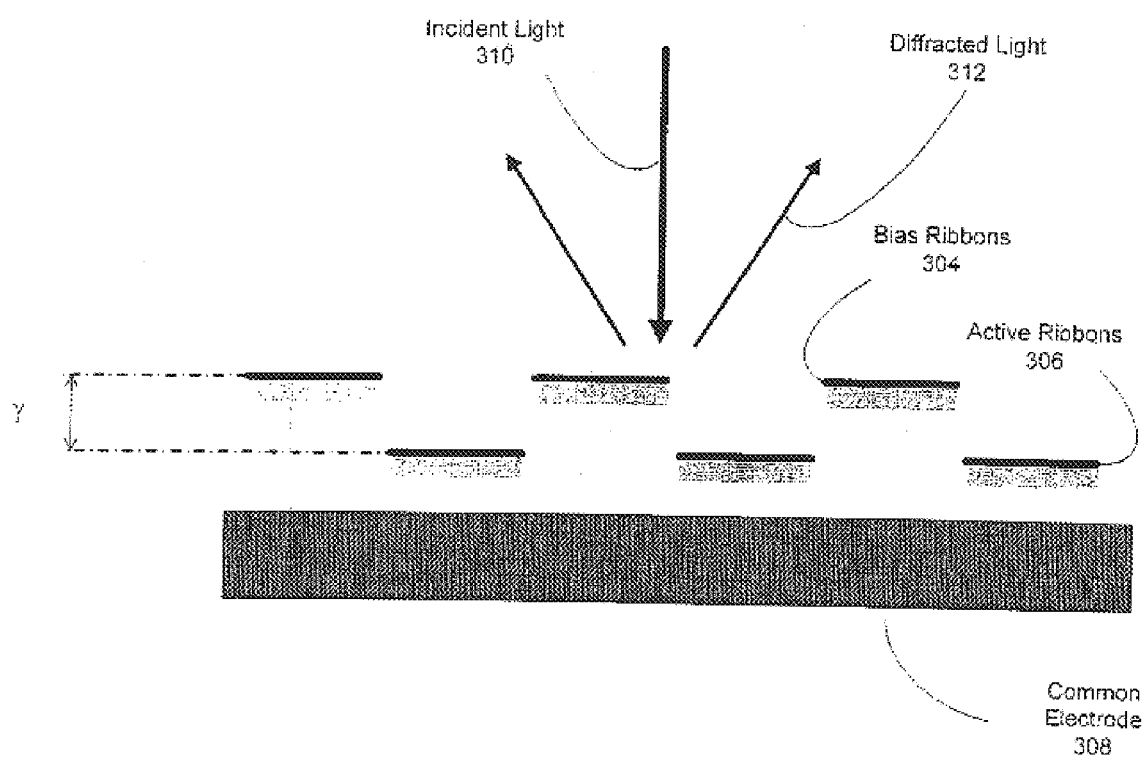

FIG. 3 is a diagram depicting deflections of reflective members for a light modulator element in a diffractive state. The light modulator element comprises a plurality of reflective members. The reflective members comprise alternating bias members 304 and active member 306. In the example illustrated, the GLV element includes three pairs of reflective members (i.e. six of them).

In the diffractive state, the reflective members are controllably arranged in an alternating configuration at two heights from a common electrode 308, where bias members 304 are at a first height and active (movable) members 306 are at a second height. The bias members 304 may be fixed ribbons. The active members 306 may be movable ribbons pulled down by application of a voltage. The voltage may be applied with respect to the common electrode 308. As illustrated in FIG. 3, the incident light beam 310 impinges upon the element at an angle perpendicular to the grating plane. Diffracted light 312 travels away from the element.

The difference between first and second heights may be defined as the deflection distance $\gamma$. The amount of the deflection $\gamma$ may be varied by application of different voltages to control the amount of incident light reflected from the element. When $\gamma$ is near zero, the element would be near a maximally reflective state. When $\gamma$ is near $\lambda/4$, where $\lambda$ is the wavelength of the incident light, the element would be near a maximally diffractive state.

Figure 4:
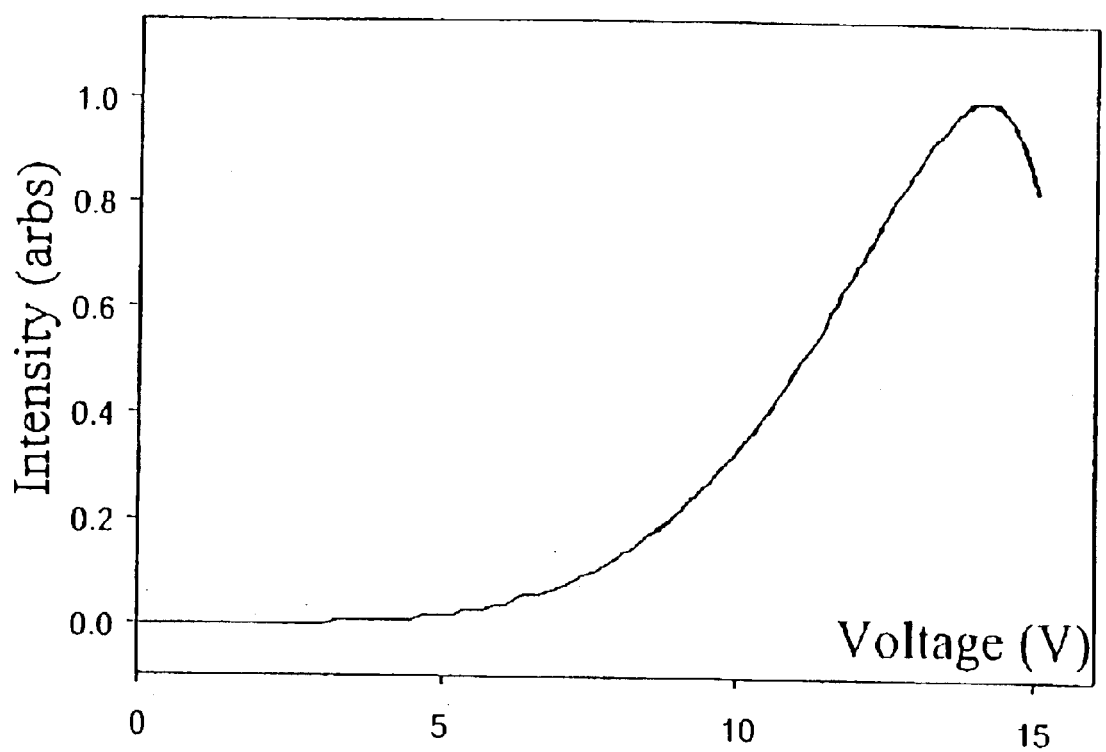

FIG. 4 is a graph illustrating a unipolar electro-optic response for a first order diffraction from a light modulator element. The graph shows intensity of light (in arbitrary units) from the first order diffraction versus voltage. The higher the voltage is, the larger is the displacement γ of the element. Depending on the voltage applied to the active members, the light intensity varies. For the most part, the higher the applied voltage, the higher the light intensity for the first order diffraction. (This relationship reverses for sufficiently high voltages where the light intensity reduces with higher voltages, and hence the downward slope of the graph at the far right.)

Figure 5A:
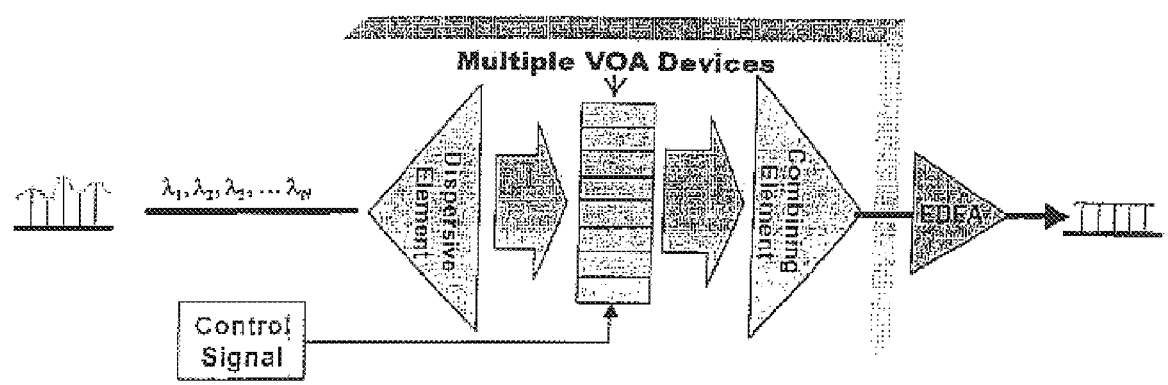
FIG. 5A is a diagram illustrating elements of a light-modulating array being utilized as variable optical attenuators (VOAs) for a dynamic gain equalizer (DGE).

FIG. 5A is a diagram illustrating elements of a light-modulating array-being utilized as variable optical attenuators (VOAs) for a dynamic gain equalizer (DGE). The multiple VOA devices shown in FIG. 5A may correspond to light modulator devices in a linear array. The input light signals of various wavelengths ($\lambda_1, \lambda_2, \lambda_3, \ldots \lambda_N$) may originally have various amplitude levels. The multiple wavelengths are dispersed by the dispersive element onto the multiple VOA devices. Each wavelength may be attenuated a variable amount by the VOA device on which it impinges. The wavelengths may then be combined by the combining element and subsequently amplified, for example, by an erbium doped fiber amplifier (EDFA). As a result, the amplitudes (gain levels) of the various wavelengths may be equalized.

Figure 5B:
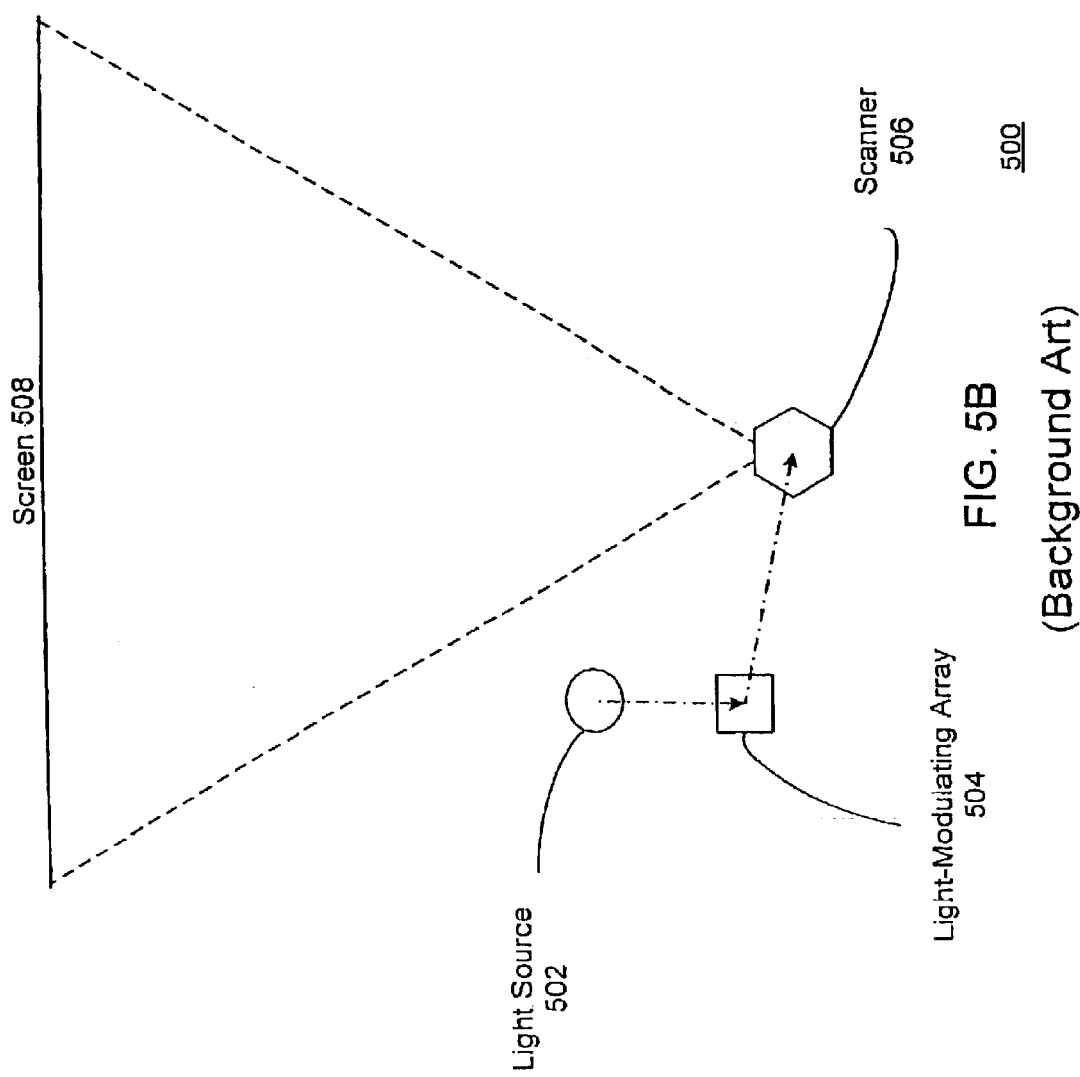
FIG. 5B is a top view depicting a projection display system utilizing a light-modulating array.

FIG. 5B is a top view depicting a projection display system 500 utilizing a light-modulating array. The system 500 includes one or more light sources 502, one or more arrays of light-modulating elements 504, an optical scanner 506, and a screen 508. The figure is for explanatory purposes and is not necessarily accurate in scale or angles.

The light source 502 may comprise one or more laser light sources. Three laser light sources of different colors may be utilized for a color display system. The light-modulating array 504 may comprise an array of light modulator elements (also called light modulator "pixels") described above. Each light source 502 may illuminate a light-modulating array 504. Each element of an array 504 modulates the light incident on it to control the amount of light diffracted therefrom. The diffracted light from the elements of the array 504 is then directed to the optical scanner 506.

The optical scanner 506 is used to move the column (or row) of light across the screen 508. Various types of scanners 506 may be used. For example, galvanometer-based scanners, resonant scanners, polygon scanners, rotating prisms, or other types of scanners may be used. A drive signal is applied to the scanner to control ("drive") the movement of the column (or row) of light. For example, to achieve a progressive scan of the column across the screen (e.g., from left to right), a sawtooth drive signal may be used.

Bipolar DC Drive

This section describes a bipolar DC (direct current) drive for light-modulating elements. Using a bipolar DC drive is one technique for reducing charge build-up and is described herein for purposes of contrast with the high-frequency AC drive technique. The bipolar DC drive technique is also described in commonly-owned U.S. patent application Ser. No. 10/183,579, entitled "Bipolar Operation of Light-Modulating Array," filed Jun. 26, 2002, by inventors David A. LeHoty and Bryan Staker. The disclosure of that prior application is hereby incorporated by reference in its entirety.

Figure 6:
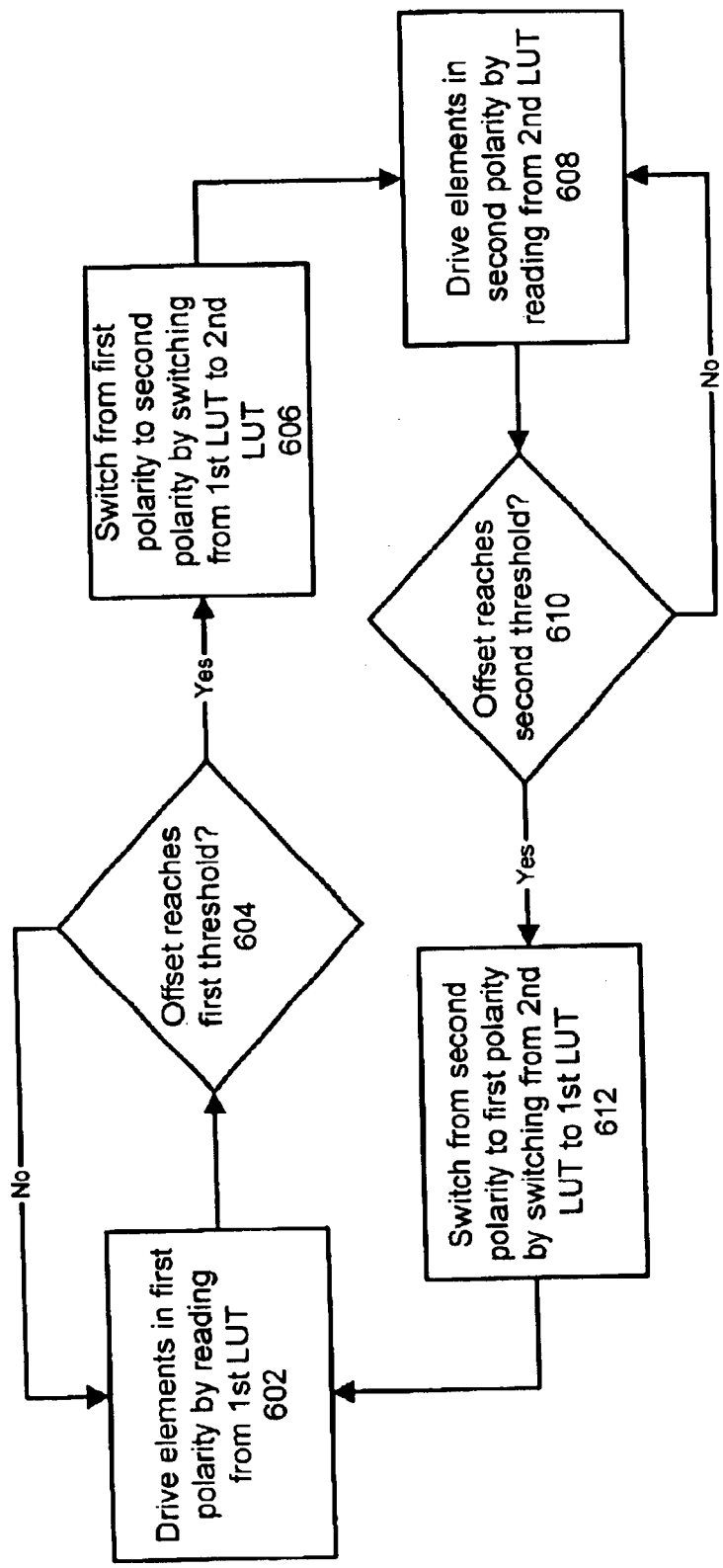
FIGS. 6, 7, 8A and 8B relate to a bipolar DC (direct current) drive technique.

FIG. 6 is a flow chart depicting a method 600 for bipolar DC driving of a light-modulating array. As depicted, the method 600 includes four steps (602, 604, 606, and 608).

In the first step 602, elements of the array are driven to a DC level of a first polarity. The DC level of a first polarity refers to an applied electric potential where the voltages driving the active elements are generally more positive than the voltage at the bias element and the common electrode. The first polarity may correspond, for example, to positive voltages being applied to the active element while the bias element and the common electrode are held at ground (zero volts). As another example, the first polarity may correspond to less negative voltages being applied to the active element while the bias element and the common electrode are held at a more negative voltage level.

For each element, the DC-level voltage to be applied to attain a desired intensity level may be determined by using a first look-up table (LUT). An example of such a first LUT is described below in relation to FIG. 8A.

In the second step 604, the apparatus switches from operating in a first polarity mode to operating in a second polarity mode. The switch in polarity may be accomplished by switching from using the first LUT to using a second LUT.

In the third step 606, elements of the array are driven to a DC level of the second polarity. The DC level of the second polarity refers to an applied electric potential where the voltages driving the active elements are generally more negative than the voltage at the bias element and the common electrode. The second polarity may correspond, for example, to negative voltages being applied to the active element while the bias element and the common electrode are held at ground (zero volts). As another example, the second polarity may correspond to less positive voltages being applied to the active element while the bias element and the common electrode are held at a more positive voltage level.

For each element, the DC-level voltage to be applied to attain a desired intensity level may be determined by using a second look-up table (LUT). An example of such a second LUT is described below in relation to FIG. 8B.

In the fourth step 608, the apparatus switches from operating in the second polarity mode back to operating in the first polarity mode. This switch in polarity may be accomplished by switching from using the second LUT to using the first LUT.

By switching polarities as described above, the electric fields in the elements of the array are reversed. The reversal of electric fields advantageously reduces the charge build-up on the elements as the charges tend to cancel out over time.

Figure 7:
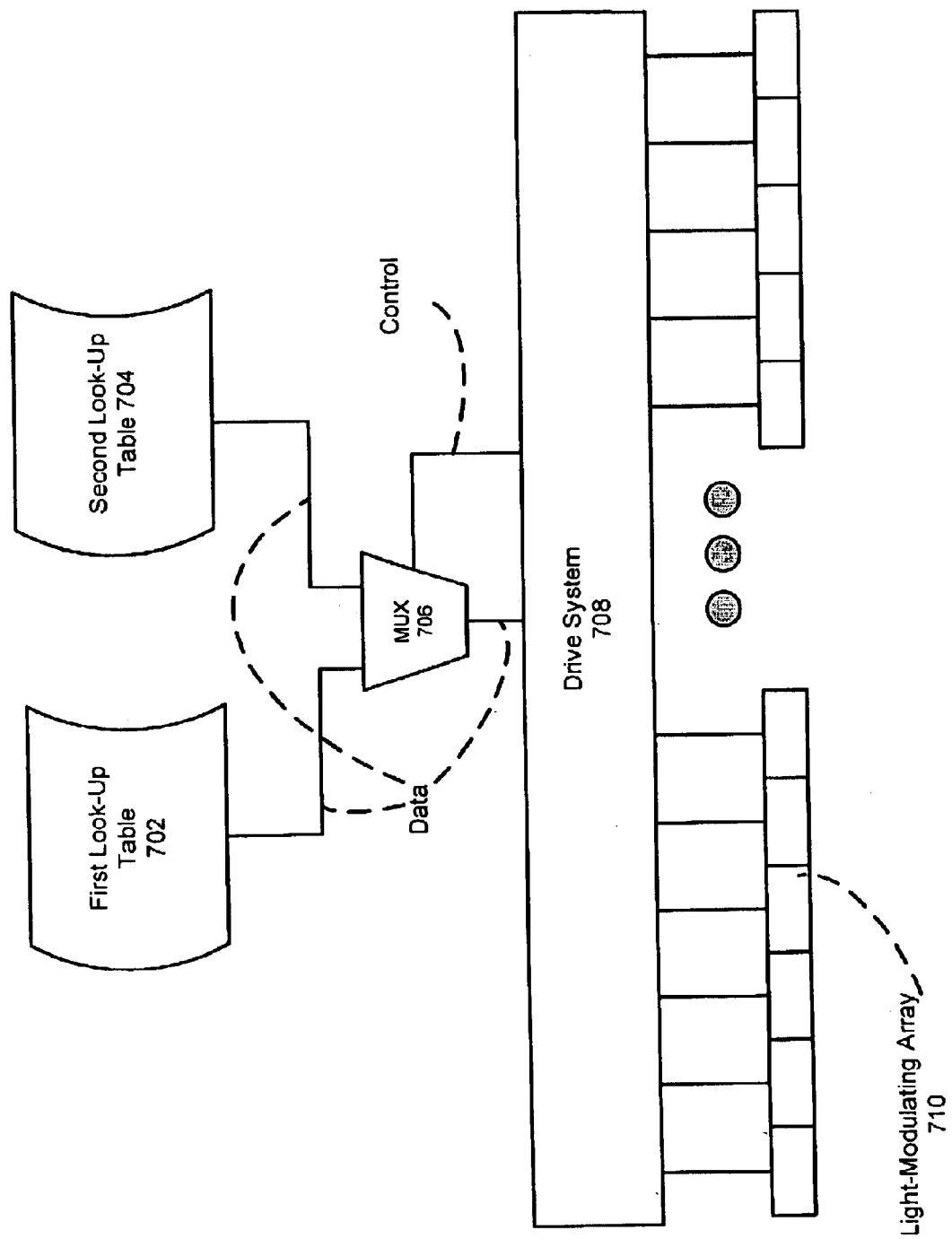

FIG. 7 is a diagram depicting an apparatus 700 for bipolar DC operation of a light-modulating array. The apparatus 700 includes a first look-up table (LUT) 702, a second LUT 704, a multiplexor (MUX) 706, a drive system 708, and a light-modulating array 710.

The first LUT 702 provides data for use during operation in the first polarity mode, and the second LUT 704 provides data for use during operation in the second polarity mode. Examples of first and second LUTs are described below in relation to FIGS. 8A and 8B, respectively. The LUTs 702 and 704 may be implemented in a memory structure. In one embodiment, the LUTs would be implemented in a semiconductor memory that provides rapid access to the data stored therein.

The MUX 706 provides for selection of either the first LUT 702 or the second LUT 704. In the first polarity mode, the MUX 706 gives the drive system 708 access to data from the first LUT 702. In the second polarity mode, the MUX 706 gives the drive system 708 access to data from the second LUT 704. In one embodiment, the MUX 706 may be controlled by a control signal from the drive system 708. The control signal may simply be a bit signal such that the first LUT 702 is selected when the bit is high and the second LUT 704 is selected when the bit is low (or vice-versa).

The drive system 708 looks up DC drive voltages corresponding to desired intensities for each element of the light-modulating array 710. The drive system 708 then applies the looked-up DC voltage to the appropriate element of the array 710 to achieve the desired intensity from that element.

In an alternative configuration, both the first 702 and second 704 LUTs may be implemented as a combined LUT. Such a combined LUT would have data for both the first polarity mode and for the second polarity mode in a single table. Such a combined LUT would require a separate field to distinguish data for the first polarity mode from data for the second polarity mode.

Figure 8A:

FIG. 8A is a diagram depicting information in a first look-up table (LUT) 800 of a first polarity. The first LUT 800 includes three data fields: element identifier (ID) 802; desired intensity 804; and DC drive voltage 806.

In this example, there are 1024 elements in the light-modulating array. Hence, the element IDs 802 depicted in FIG. 8A range from one (1) to one thousand twenty four (1024). Of course, various numbers of elements may be in the light-modulating array, and the number of element IDs 802 will vary accordingly.

The example shows the desired light intensity 804 ranging from 0 to 255. This corresponds to two hundred fifty six (256) intensity levels, Two hundred fifty six (256) different levels may be distinguished using eight (8) bits of information. Of course, various numbers of intensity levels may be available in different systems, and the number of desired intensities 804 will vary accordingly.

The values for the DC drive voltages 806 in FIG. 8A shown are for purposes of illustration. The DC drive levels are shown-as varying between about zero-volts (0 V) to about positive fourteen volts (13.8 V in the figure). For elements that comprise light modulator devices, larger voltage differences are needed at the lower intensities, and smaller voltage differences are needed at the higher intensities. This is seen from the intensity versus voltage curve in FIG. 4.

The DC drive voltages 806 in the first LUT 800 may be determined by a calibration procedure. The calibration procedure may be performed periodically. As a result of the calibration, the appropriate positive DC drive level 806 to achieve each desired intensity 804 will be determined for each element 802 of the array. These calibration results are stored in the first LUT 800.

Figure 8B:

FIG. 8B is a diagram depicting information in a second look-up table 850 of a second polarity. The second LUT 850 includes the same three data fields (element ID 802; desired intensity 804; and DC drive voltage 806) as the first LUT 800. Moreover, the data for the element IDs and for the desired intensity levels are the same in the second LUT 850 as in the first LUT 800. This is because the identification of the elements in the light-modulating array 710 does not change depending on the polarity mode, and the desired light intensities also do not change depending on the polarity mode.

However, the DC drive voltages 806 in the second LUT 850 do differ from those in the first LUT 800. The values for the DC drive voltage levels 806 in FIG. 8B shown are for purposes of illustration. The DC drive levels are shown as varying between about zero volts (0 V) to about negative thirteen volts (-13.1 V in the figure). In one embodiment, the second LUT 850 may actually store positive values that are converted to negative voltage levels when the system is in the second (negative) polarity mode.

The DC drive voltages 806 in the second LUT 850 may also be determined by periodic calibration. As a result of the calibration, the appropriate negative drive levels 806 to achieve each desired intensity 804 will be determined for each element 802 of the array. These calibration results are stored in the second LUT 850.

High-Frequency AC Drive

The high-frequency AC (alternating current) drive is described in this section. While the bipolar DC drive applies DC voltages to drive the light modulator ribbon to specified displacements, the high-frequency AC drive applies AC voltages to achieve the same or similar effect. The AC voltages are applied at frequencies that are substantially greater than the resonance frequency of the light modulator ribbon. As a result, DC-like displacements are achieved using the AC drive signals.

Figure 9:
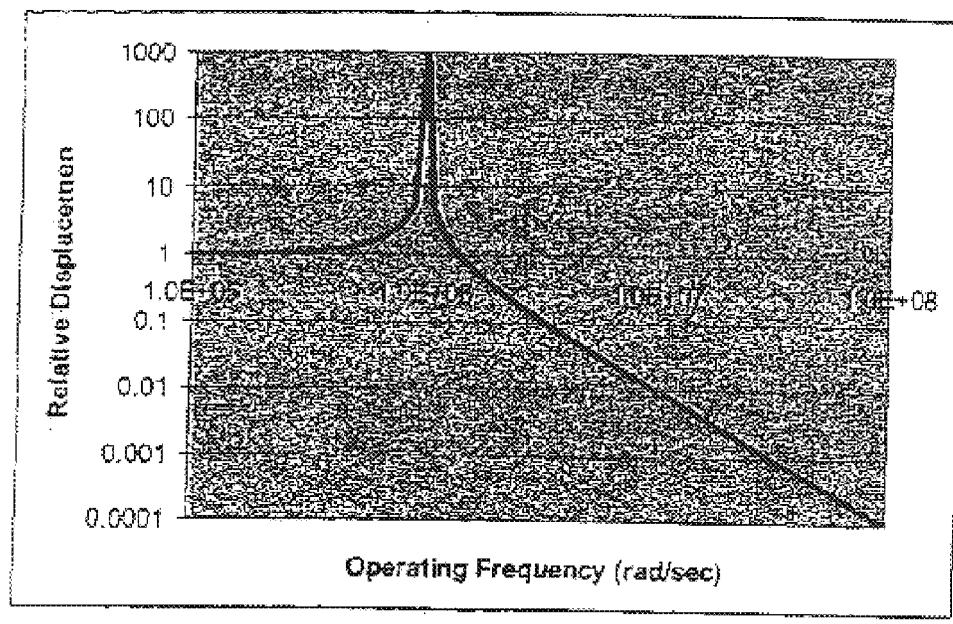

Light modulator ribbons and various other MEM devices are capacitively coupled. Such devices may be considered as essentially low-pass mechanical filters with a mechanical resonance frequency. FIG. 9 is a graph depicting an example mechanical resonance. The graph depicts relative displacement as a function of operating frequency. In this example, the resonance frequency is at $1 \times 10^6$ radians/sec where the peak of the curve appears. In this example, the quality factor Q for the resonance is 1000. Of course, the parameters and details of the mechanical resonance will depend on the characteristics of the specific MEM device.

The graph of FIG. 9 shows that, in this example, when the operating frequency is about three times higher than the resonance frequency, then the relative displacement goes down to about 0.1. It further shows, for example, that when the operating frequency is about ten times higher than the resonance frequency, then the relative displacement goes down to about 0.01. It further shows, for example, that when the operating frequency is about one hundred times higher than the resonance frequency, then the relative displacement goes down to about 0.0001.

Figure 10:
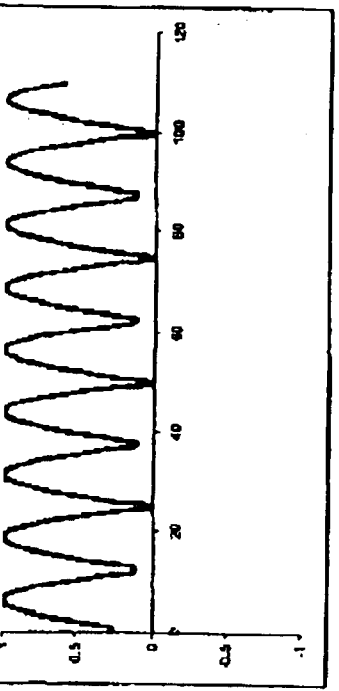

FIG. 10 is a graph depicting a high-frequency AC drive signal as a function of time in accordance with an embodiment of the present invention. The drive signal in this instance is shown as an applied voltage signal. The signal is shown on a normalized vertical scale and a horizontal scale of arbitrary time units.

The frequency of the high-frequency AC drive signal drives the operation of the light modulator ribbon or similar MEM feature, so the frequency of the AC drive signal is essentially the operating frequency discussed above in relation to FIG. 9. The shape of the high-frequency AC drive signal is shown as sinusoidal. Alternatively, the shape may be non-sinusoidal with similar effect. An example of a square wave drive signal is described below in relation to FIG. 16.

If the rate of charging is the same (but opposite) for negative and positive applied voltages, then no charge build-up should occur in the MEM device for high-frequency AC drive signals with zero offset. If some charge build-up still occurs, it may also be possible to compensate for the residual charge build-up by adjusting the offset voltage in the opposite direction. For example, if there is positive charge build-up at zero offset voltage, then a slightly negative offset voltage may be used to compensate. Similarly, if there is a negative charge build-up at zero offset voltage, then a slightly positive offset voltage may be used to compensate.

Figure 11:
Figure 11:
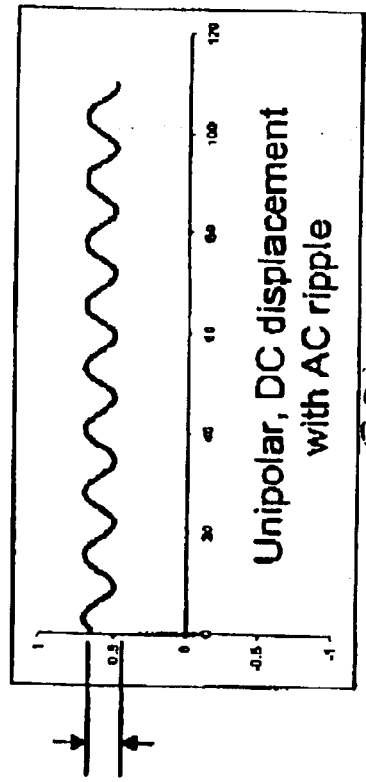

FIG. 11 is a graph depicting the applied force as a function of time due to the high-frequency AC drive signal in accordance with an embodiment of the present invention.

The applied force is shown on a normalized vertical scale and a horizontal scale of arbitrary time units (the same horizontal scale as FIG. 10).

Since the light modulator ribbon or similar MEM device feature is capacitively coupled, the applied force should be proportional to the square of the voltage and thus independent of the polarity of the drive signal. Hence, the high-frequency AC drive signal produces a rectified, unipolar force signal as illustrated in FIG. 11.

Figure 12:
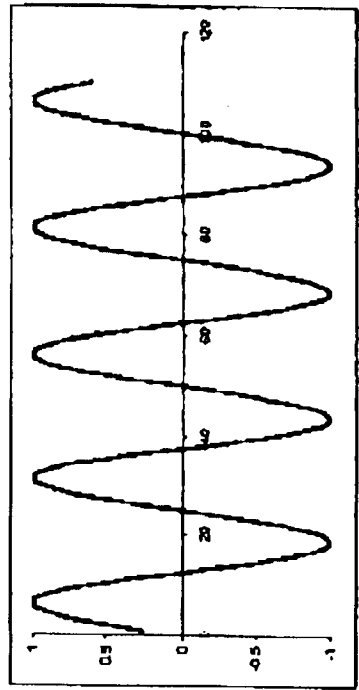

FIG. 12 is a graph depicting the resulting displacement as a function of time of a light modulator ribbon or similar MEM feature being driven in accordance with an embodiment of the present invention. The resulting displacement is shown on a normalized vertical scale and a horizontal scale of arbitrary time units (again, the same horizontal scale as FIGS. 10 and 11).

In accordance with an embodiment of the invention, at operating frequencies much higher than the mechanical resonance frequency, the resulting displacement is shown to be characterized by an average "DC" displacement and an "AC" deflection ripple. The average displacement is proportional to the average applied force. The frequency of the deflection ripple is the frequency of the high-frequency AC drive signal. The amplitude of the deflection ripple depends on how much greater the frequency of the drive signal is than the resonance frequency of the movable feature being driven.

The transformation from FIG. 11 to FIG. 12 may be considered as being due to mechanical filtering. The light modulator ribbons and other similar MEM devices are mechanical devices that may be considered as low-pass mechanical filters. The inertia of the movable feature prevents instantaneous responses, so the feature primarily responds to the time-averaged force at high frequencies.

In contrast, the conventional system uses operating frequencies below the mechanical resonance frequency. At those lower operating frequencies, the movable feature being driven follows (in-phase) the force as applied by the driving signal.

Figure 13:
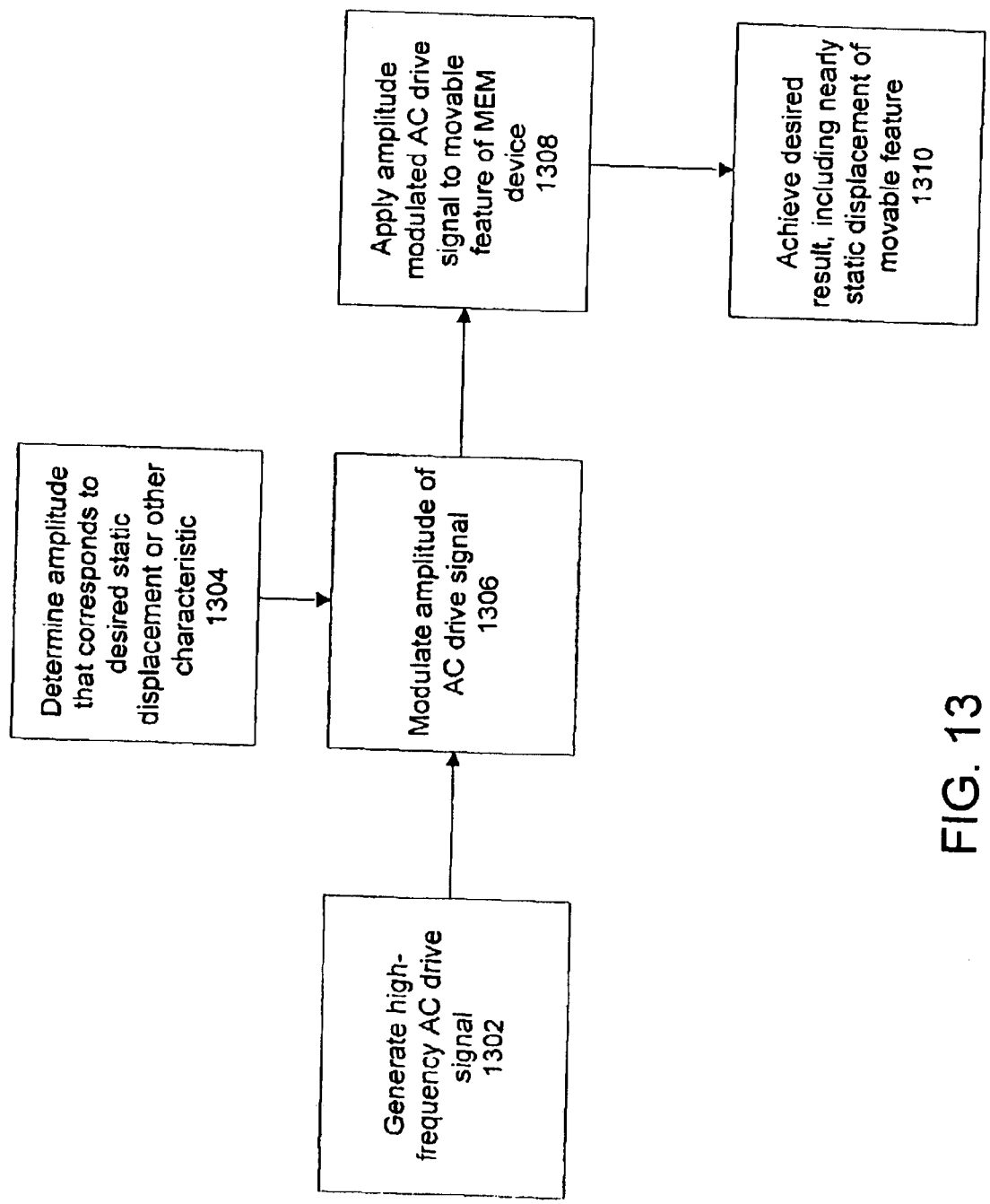

FIG. 13 is a flow chart depicting a method for driving a MEM device in accordance with an embodiment of the invention. A high-frequency AC drive signal is generated 1302. The drive signal should be substantially higher in frequency than a resonance frequency of a movable feature in the MEM device. In addition, a determination 1304 is made as to the amplitude of the AC drive signal that will result in a desired static displacement of the movable feature (or a desired other measurable characteristic). This determination may be made, for example, using a look-up table as described below in relation to FIG. 15.

The high-frequency AC drive signal is then amplitude modulated 1306 to achieve the previously determined amplitude. The amplitude modulated AC drive signal is applied 1308 to drive the movable feature. The desired result is thus achieved 1310, including a nearly static (DC-like) displacement of the movable feature in the MEM device.

Figure 14:
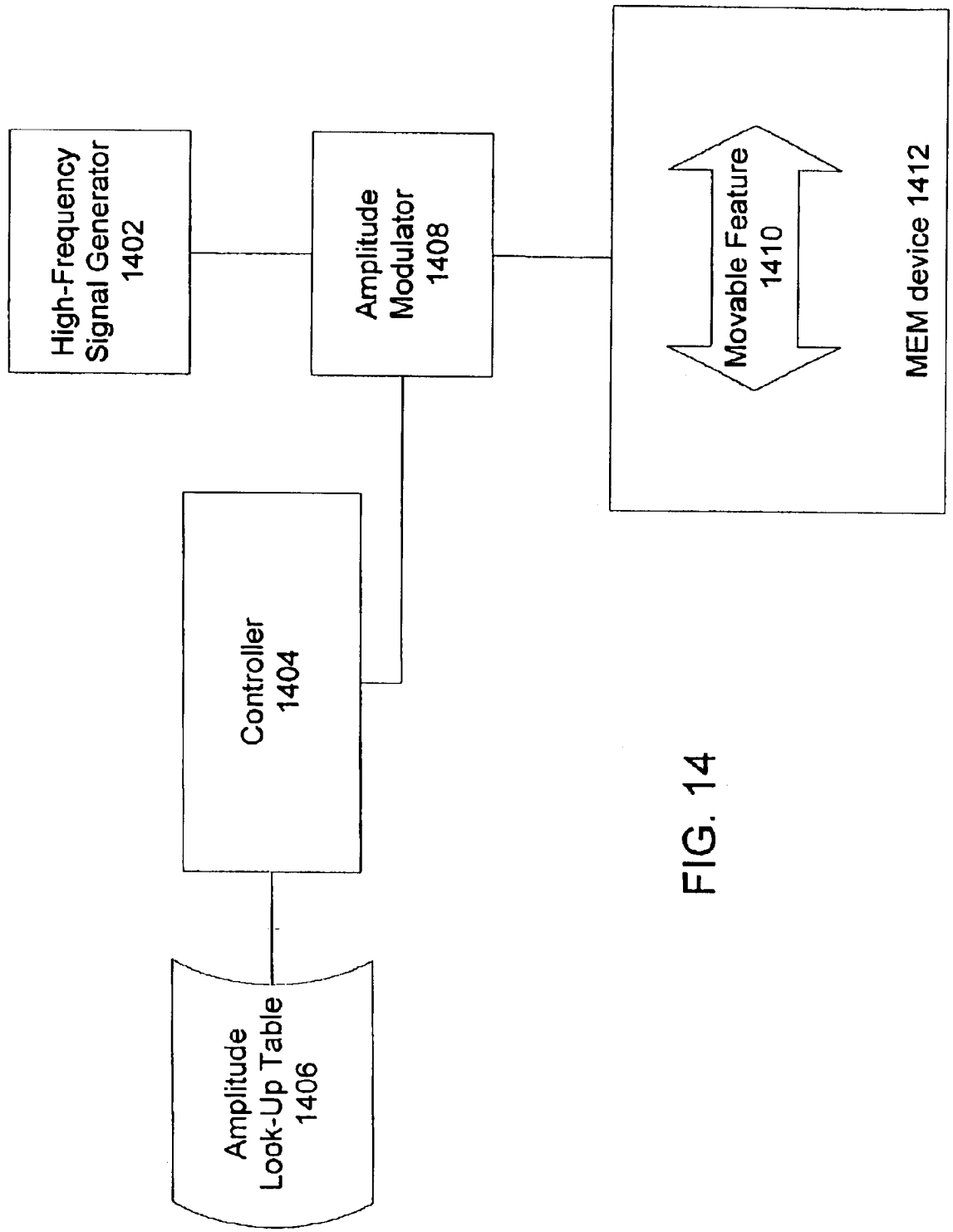

FIG. 14 is a schematic diagram of an apparatus for driving a MEM device in accordance with an embodiment of the invention. As depicted, the apparatus includes a high-frequency signal generator 1402, a controller 1404, a look-up table 1406, and an amplitude modulator 1408.

The signal generator 1402 generates the high-frequency AC drive signal. The drive signal generated is substantially higher in frequency than a resonance frequency of a movable feature 1410 in the MEM device 1412. The drive signal frequency utilized should be sufficiently high so that the AC deflection ripple is within the tolerance of the particular system. In one embodiment, shielding may be utilized to mitigate electromagnetic interference (EMI) from the high-frequency signal.

The following examples are derived using the resonance graph of FIG. 9. For example, the drive signal frequency may be about three times the pertinent resonance frequency in order to achieve a deflection ripple of about 10% of the average displacement. As another example, the drive signal frequency may be about ten times the pertinent resonance frequency in order to achieve a deflection ripple of about 1% of the average displacement. As another example, the drive signal may be about thirty times the pertinent resonance frequency in order to achieve a deflection ripple of about 0.1%. As yet another example, the drive signal frequency may be about one hundred times the pertinent resonance frequency in order to achieve a deflection ripple of about 0.01% of the average displacement. As yet another example, the drive signal frequency may be about one thousand times the pertinent resonance frequency in order to achieve a deflection ripple of about 0.0001% of the average displacement. The drive signal frequency may be further increased to achieve an even smaller deflection ripple if required by the system's tolerance to the ripple.

The controller 1404 makes a determination as to the amplitude of the AC drive signal that will result in a desired static displacement of the movable feature (or a desired other measurable characteristic). This determination may be made, for example, using a single look-up table 1406 to rapidly determine the appropriate amplitude to be applied. Such a look-up table 1406 is described further below in relation to FIG. 15. The controller 1404 communicates the appropriate amplitude level to the amplitude modulator 1408.

The amplitude modulator 1408 receives the high-frequency AC drive signal and modulates it to achieve the previously determined amplitude level. The amplitude modulated AC drive signal is applied to the MEM device 1412 to drive the movable feature 1410. The desired result is thus achieved, including a nearly static (DC-like) displacement of the movable feature 1410. The amplitude modulation applied may be digital such that the high-frequency AC drive signal is either on or off, or it may be analog such that the amplitude level may varied in an analog manner.

FIG. 15 is a diagram depicting the fields of an amplitude look-up table (LUT) 1406 for high-frequency AC driving of a MEM device in accordance with an embodiment of the invention. The LUT 1406 may include three data fields: element identifier (ID) 1502; desired displacement level or other measurable characteristic 1504; and AC drive signal amplitude 1506. The frequency of the high-frequency drive signal may be pre-set depending on the characteristics of the MEM device and upon the tolerances of the particular application.

Figure 16:
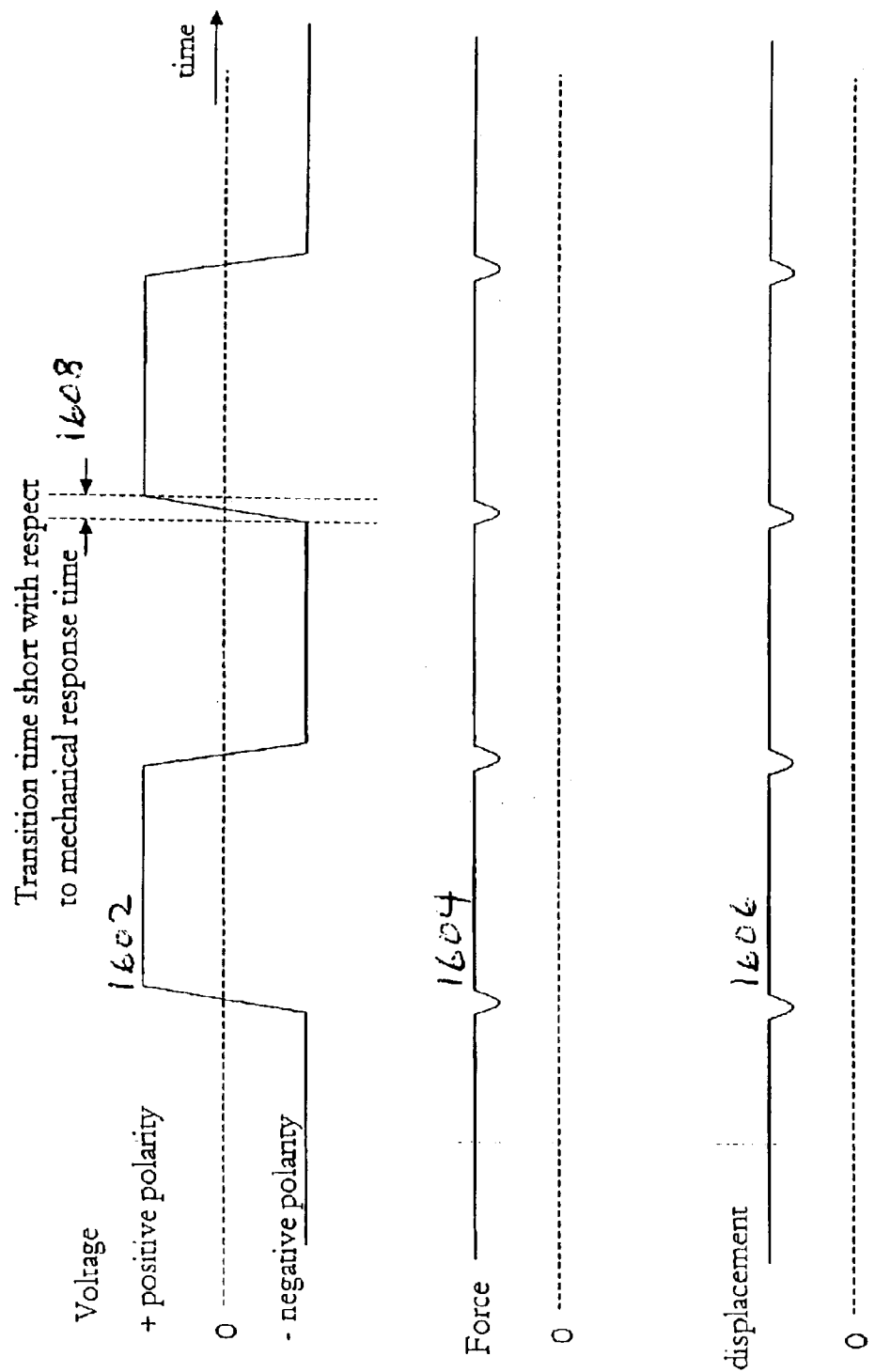
FIG. 16 is a diagram illustrating a square-wave bipolar drive signal in accordance with an embodiment of the invention.

FIG. 16 is a diagram illustrating a square-wave bipolar drive signal 1602 in accordance with an embodiment of the invention. When applied to a MEM device, the square-wave signal 1602 generates a force 1604 and displacement 1606 that is almost a pure DC force and displacement, except for small features or bumps that correspond to the transition 1608 between positive and negative (and vice-versa) polarities of the square wave. The transitions 1608 should be sufficiently fast such that the movable feature of the MEM device does not significantly change its displacement during the transition (i.e. that any change of displacement is within tolerance of the system). Note that, for a square-wave bipolar drive signal, the frequency of the square wave may be set independently from the resonant frequency. For example, the square wave frequency may be set to be substantially lower than the resonant frequency. The DC-like displacement would be achievable so long as the transition times are sufficiently short with respect to the resonance. Hence, in this particular case, the square wave drive signal need not be of high frequency, but the transition times between polarities needs to be fast.

Conclusion

The above-described high-frequency AC drive technique for MEM devices may be used to advantageously achieve a nearly static deflection without charge build-up. This technique may be applied not only to light modulator devices. It may also be applied to other capacitively coupled MEM devices. Larger MEM devices and those with lower frequency torsional modes may be very well suited to be driven with this high-frequency AC drive technique.

In the present disclosure, numerous specific details are provided such as examples of apparatus, process parameters, materials, process steps, and structures to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

While specific embodiments of the present invention have been provided, it is to be understood that these embodiments are for illustration purposes and not limiting. Many additional embodiments will be apparent to persons of ordinary skill in the art reading this disclosure. Thus, the present invention is limited only by the following claims.

What is claimed is:

1. A method for driving a micro electromechanical (MEM) device, the method comprising:

generating a high-frequency AC drive signal that is substantially higher in frequency than a resonance frequency of a movable feature in the MEM device;

modulating the amplitude of the high-frequency AC drive signal; and driving the movable feature in the MEM device using the amplitude modulated high-frequency AC drive signal to achieve a DC-like displacement of the movable feature.

2. The method of claim 1, wherein the amplitude modulation includes digital (on/off) modulation.

3. The method of claim 1, wherein the frequency of the high-frequency AC drive signal is at least three times that of the resonance frequency.

4. The method of claim 1, wherein the DC-like displacement comprises an average displacement and a deflection ripple, and wherein the deflection ripple is negligible such that the DC-like displacement comprises a static displacement.

5. The method of claim 1, wherein the high-frequency AC drive signal comprises a zero-offset AC signal.

6. The method of claim 1, wherein the high-frequency AC drive signal includes a non-zero offset which is adjustable to compensate for residual charge build-up.

7. The method of claim 1, wherein the high-frequency AC drive signal comprises a waveform of a group of waveforms including a sinusoidal oscillation, a square waveform and a triangular waveform.

8. The method of claim 1, wherein the MEM device comprises a light-modulating device.

9. The method of claim 8, wherein the movable feature comprises a movable ribbon of the light modulating device.

10. The method of claim 1, wherein the method mitigates charge build-up in the MEM device.

11. An apparatus for driving a movable feature in a micro electromechanical (MEM) device, the apparatus comprising:

a high-frequency signal generator for generating an AC drive signal that is substantially higher in frequency than a resonance frequency of the movable feature in the MEM device;

an amplitude modulator for modulating the high-frequency AC drive signal to an appropriate amplitude prior to application of the drive signal to the movable feature; and a controller for determining the appropriate amplitude, wherein said appropriate amplitude corresponds to a nearly static displacement of the movable feature.

12. The apparatus of claim 11, wherein the amplutide modulation includes digital (on/off) modulation.

13. The apparatus of claim 11, wherein the frequency of the high-frequency AC drive signal is at least three times that of the resonance frequency.

14. The apparatus of claim 11, wherein the nearly static displacement comprises an average displacement and a deflection ripple, and wherein the deflection ripple is negligible such that the nearly static displacement is static for practical purposes.

15. The apparatus of claim 11, wherein the high-frequency AC drive signal comprises a zero-offset AC signal.

16. The apparatus of claim 11, wherein the high-frequency AC drive signal includes a non-zero offset which is adjustable to compensate for residual charge build-up.

17. The apparatus of claim 11, wherein the high-frequency AC drive signal comprises a waveform of a group of waveforms including a sinusoidal oscillation, a square waveform and a triangular waveform.

18. The apparatus of claim 11, wherein the MEM device comprises a light-modulating device.

19. The apparatus of claim 18, wherein the movable feature comprises a movable ribbon of the light modulating device.

20. A system for driving a micro electromechanical (MEM) device, the system comprising:

means for generating a high-frequency AC drive signal that is substantially higher in frequency than a resonance frequency of a movable feature in the MEM device;

means for modulating the amplitude of the high-frequency AC drive signal; and means for driving the movable feature in the MEM device using the amplitude modulated high-frequency AC drive signal to achieve a DC-like displacement of the movable feature.

21. A method for driving a micro electromechanical (MEM) device, the method comprising:

generating a square-wave bipolar drive signal with a positive polarity and a negative polarity; and driving a movable feature in the MEM device using the square-wave bipolar drive signal, wherein a transition time between the polarities of the square-wave bipolar drive signal is shorter than a response time of the movable feature, such that a nearly static displacement of the movable feature is achieved.

* * * * *